(No Model.) 2 Sheets—Sheet 1.
A. F. CHABLE.
VAPOR BURNER.
No. 441,747. Patented Dec. 2, 1890.
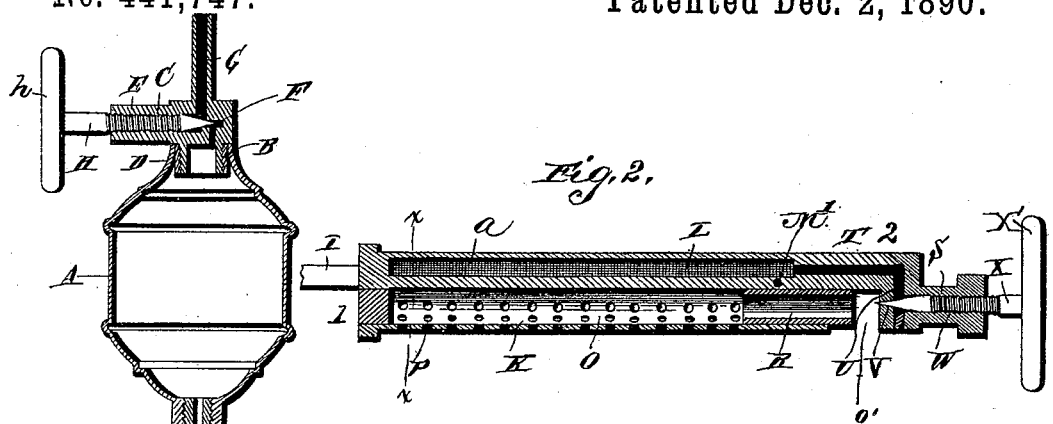
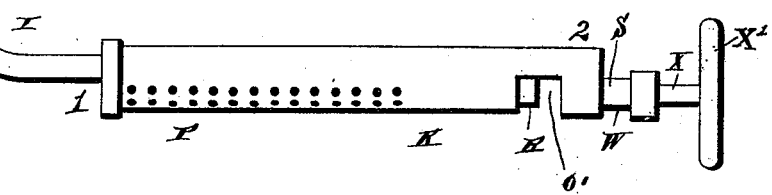
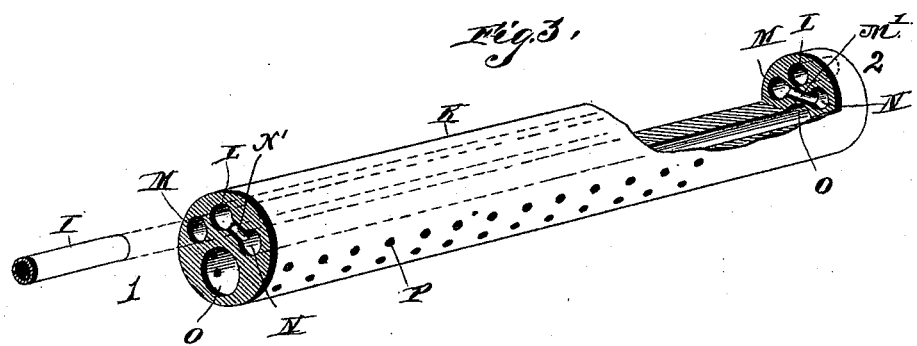

(No Model.) 2 Sheets—Sheet 2.

A. F. CHABLE.
VAPOR BURNER.

No. 441,747. Patented Dec. 2, 1890.

Witnesses
C. M. Gallaher
Percy C. Bowen

Inventor
Aug. F. Chable.
By his Attorneys,
C. A. Snow & Co.

UNITED STATES PATENT OFFICE.

AUGUST FRANCIS CHABLE, OF MARION, KANSAS, ASSIGNOR OF ONE-HALF TO JOSEPH C. PRICE, OF EVANSVILLE, INDIANA.

VAPOR-BURNER.

SPECIFICATION forming part of Letters Patent No. 441,747, dated December 2, 1890.

Application filed December 30, 1887. Serial No. 259,423. (No model.)

*To all whom it may concern:*

Be it known that I, AUGUST FRANCIS CHABLE, a citizen of the United States, residing at Marion, in the county of Marion and State of Kansas, have invented a new and useful Improvement in Vapor-Burners, of which the following is a specification.

My invention relates to an improvement in vapor-burners for heating hollow sad-irons and similar uses, the object in view being to provide a simple, compact, safe, and durable burner which is easily operated and applied and thoroughly effective in use, and is adapted for heating hollow sad-irons, both reversible and stationary, and for various other purposes, in connection with small portable or pocket stoves, peanut, pop-corn, and coffee roasters, and other similar devices.

My present invention is an improvement on the heating device for which Letters Patent of the United States No. 354,685 were granted to me December 21, 1886.

With the above-stated objects in view my invention consists of the peculiar construction and combination of parts that will be more fully described hereinafter, and the specific points of novelty thereof particularly pointed out in the claims.

Figure 4:
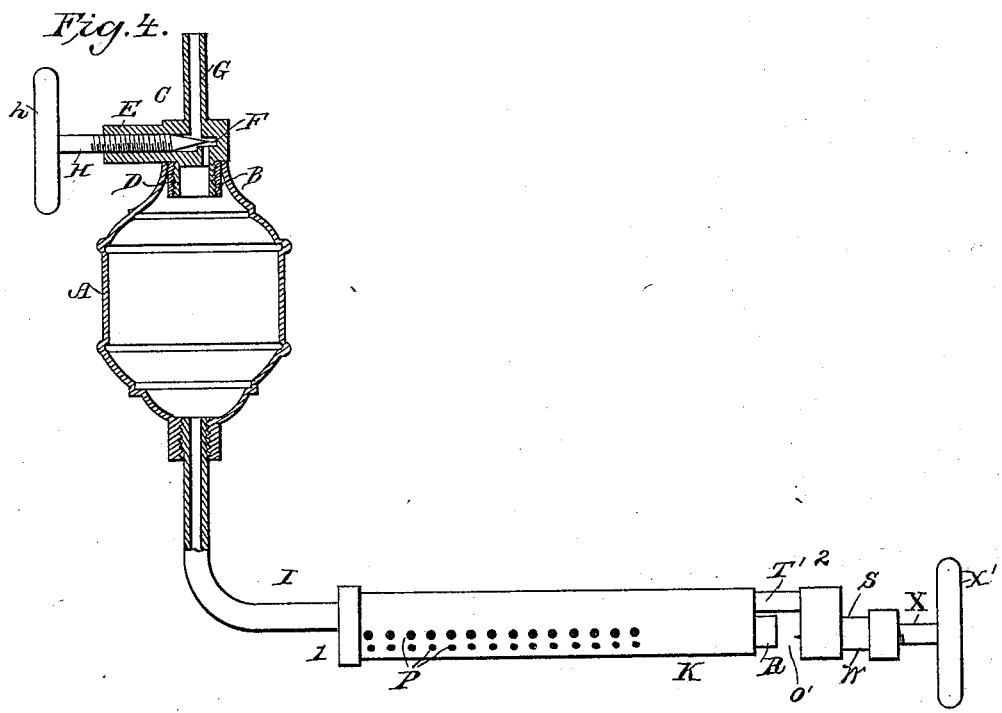
Figure 5:
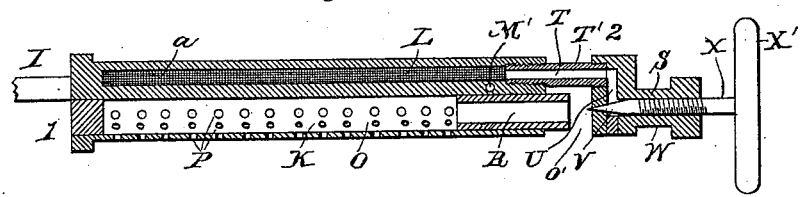

In the accompanying drawings, Figure 1 is a side elevation of my improved burner and tank, showing the tank in central section. Fig. 2 is a central longitudinal sectional view of the burner-casing. Fig. 3 is a perspective view of the burner-casing, partly in section and with a part broken away to disclose the interior arrangement. Fig. 4 is a view similar to Fig. 1 of a modified form of my invention. Fig. 5 is a central longitudinal sectional view of the same.

Like letters of reference designate similar parts in all the figures of the drawings.

By reference to Fig. 1 it will be seen that my invention consists, essentially, of a burner-casing K and a reservoir A, the latter arranged at a suitable distance from and above the said burner-casing K and connected thereto by means of a pipe I. The reservoir A is made of tin, brass, or other suitable material, and is for holding naphtha, gasoline, or other volatile fluid. In the upper side of the reservoir A is an opening having a collar B, which is provided with interior screw-threads.

C designates a valve-case, which is provided with a depending spindle or hollow sleeve D, adapted to be screwed into the collar B, as shown in Fig. 1. The said valve-case C is provided on one side with a projecting tubular sleeve E, the inner end of which communicates with the interior of the reservoir A through a channel F. An air-inlet pipe G communicates also with the channel F, and has its outer end open.

In the tubular sleeve E is arranged a needle-valve H, the stem of said needle-valve being screwed into the sleeve E and the pivot thereof arranged to extend into the channel F, for the purpose of opening and closing the said channel to any desired extent, which is accomplished by turning the said needle-valve by means of the thumb-wheel $h$, as will be readily understood.

The casing K is preferably cylindrical in form, but may be made octagonal, or in any other form, and is constructed of brass or other suitable metal. In the upper half of the casing K are formed longitudinal channels L, M, and N, which extend from end to end of the said casing. The channels M and N are closed at their outer ends, but the channel L opens at one end into a channel T, leading into a valve-case S, secured to or formed integral with one end of the casing K. For convenient reference to said casing K, the opposite ends thereof are designated by the numbers 1 and 2, the said valve-case S being formed at the end 2. The channel T opens into a channel U, which extends downwardly through the valve-case S, and is closed at the lower end.

In the lower side of the casing K is formed a cylindrical burner-chamber O, which is made longitudinally of the said casing and extends beneath and parallel with the channels L M N, the said chamber O extending almost entirely through the casing K, and having one end opening toward the valve-casing S and the other end closed. A series of radial perforations P P are made through the sides of the burner-chamber O. A longitudinally-movable mixing-tube R is fitted into the open end of the burner-chamber O.

V designates a jet-orifice which is made through the inner side of the valve-case S and has its point arranged directly opposite and in line with the center of the mixing-tube R. The inner end of the jet-orifice V opens into the channel U.

From the outer end of the valve-case S extends a tubular spindle W, which is interiorly screw-threaded to receive the correspondingly-threaded stem of a needle-valve X, the needle end of which extends into the jet-orifice V, and may be turned by the thumb-wheel X' to open or close the said jet-orifice V, as will be readily understood. A space O' is left between the inner side of the valve-case S and the adjacent end of the mixing-tube R, and the said mixing-tube may be adjusted longitudinally in the burner-chamber O to increase or diminish the size of the space O'. The purpose of this will be explained hereinafter. The pipe I, the upper end of which is secured to the lower end of the reservoir A, communicates at the end 1 of the casing K with the channel M, while the opposite end of the said channel M communicates with one end of the channel N through a cross-channel M' in the end 2 of the casing K, and the channel N is in turn connected at its opposite end with one end of the channel L through a cross-channel N' in the end 1 of the said casing. It will be seen by reference to Fig. 3 that the channels M and N are arranged at opposite sides and slightly above the center of the casing K, and the channel L is situated in the upper part of the casing K, between and somewhat above the channels M and N.

From the foregoing it will be readily understood that if fluid be forced through the pipe I into the channels of the casing K it will pass first through the channel M, then through cross-channel M' to channel N, back through channel N and through cross-channel N' to channel L, and through channel L into the channels T and U of the valve-case 19. It will thus be seen that the fluid will be caused to traverse the entire length of the burner-casing K three times before it can escape from the end of the channel L into the channels in the valve-case. The channels in the casing K are filled with a packing $a$ of fine wire-cloth or any suitable fibrous or granulated material, so that the supply of fluid from the reservoir A will be fed regularly to the burner and at the same time converted into vapor.

The operation of my invention is as follows: Naphtha, gasoline, or other suitable volatile fluid is fed from the reservoir to the casing K through the pipe I, and the casing is then heated throughout its entire length by applying the flame of a lamp thereto or by any other suitable means, which causes the fluid in the channels L, M, and N to be converted into vapor. The valve X is then turned so as to open the jet-orifice V, and the vapor is forced through the same and through the mixing-tube R into the chamber O of the burner. Atmospheric air is admitted to the said mixing-tube through the space O', which air becomes mixed with the vapor and renders the same combustible. The vapor is then ignited as it is forced in jets through the perforations P P and burns on the outside of the burner O, generating an intense heat. The supply of air admitted to the burner-chamber O may be regulated by moving the mixing-tube R (as hereinbefore described) to obtain the proportion of oxygen necessary to create a blue flame and insure perfect combustion of the vapor. The heating device is then adjusted within the iron to be heated and supported in any suitable manner, or as described in my Letters Patent before referred to. So intense is the heat generated by my improved burner that the iron may be heated to a sufficient degree in a very short time.

In the modification illustrated in Figs. 4 and 5 of the drawings I form the valve-case S in a separate piece and connect the same to the casing K by means of a pipe T', one end of which is screwed into the casing K and the opposite end thereof is screwed into the valve-case S, the channel T extending through the pipe T', as shown in Figs. 4 and 5, referred to above.

Having thus described my invention, what I claim, and desire to secure by Letters Patent, is—

1. The casing having the fluid-channel, the longitudinal chamber O, provided with perforations P, the outer end of said chamber being closed and the valve-case formed integrally with the casing and communicating with the fluid-channel, an opening O' being milled or cut out between the chamber O and the valve-case, whereby the inner end of said chamber is opened, and the jet-orifice of the valve-case being arranged opposite said open end of the chamber, substantially as described.

2. The casing having the chamber O, provided with perforations P, and having one end closed and the opposite end open, the fluid-conducting channel extending backward and forward in the casing above chamber O, and the needle-valve casing communicating with the fluid-channel and having its jet-orifice arranged opposite the open end of chamber O, substantially as described.

3. A vapor generator and burner consisting of a body having longitudinal openings therein communicating with each other, the body being provided with apertures leading from another longitudinal opening to form a burner, and being also provided with a gas-receiver, an open recess, and a gas-escape opening from the receiver, substantially as described.

In testimony that I claim the foregoing as my own I have hereto affixed my signature in presence of two witnesses.

AUGUST FRANCIS CHABLE.

Witnesses:
R. E. KNAPP,
JAMES M. WISHART.